March 1, 1960 YOSHINOBU SAKAKI 2,927,226
REMOTE CONTROL DEVICE FOR AN ELECTRICALLY DRIVEN
MINIATURE CINEMATOGRAPHIC CAMERA
Filed Oct. 29, 1958
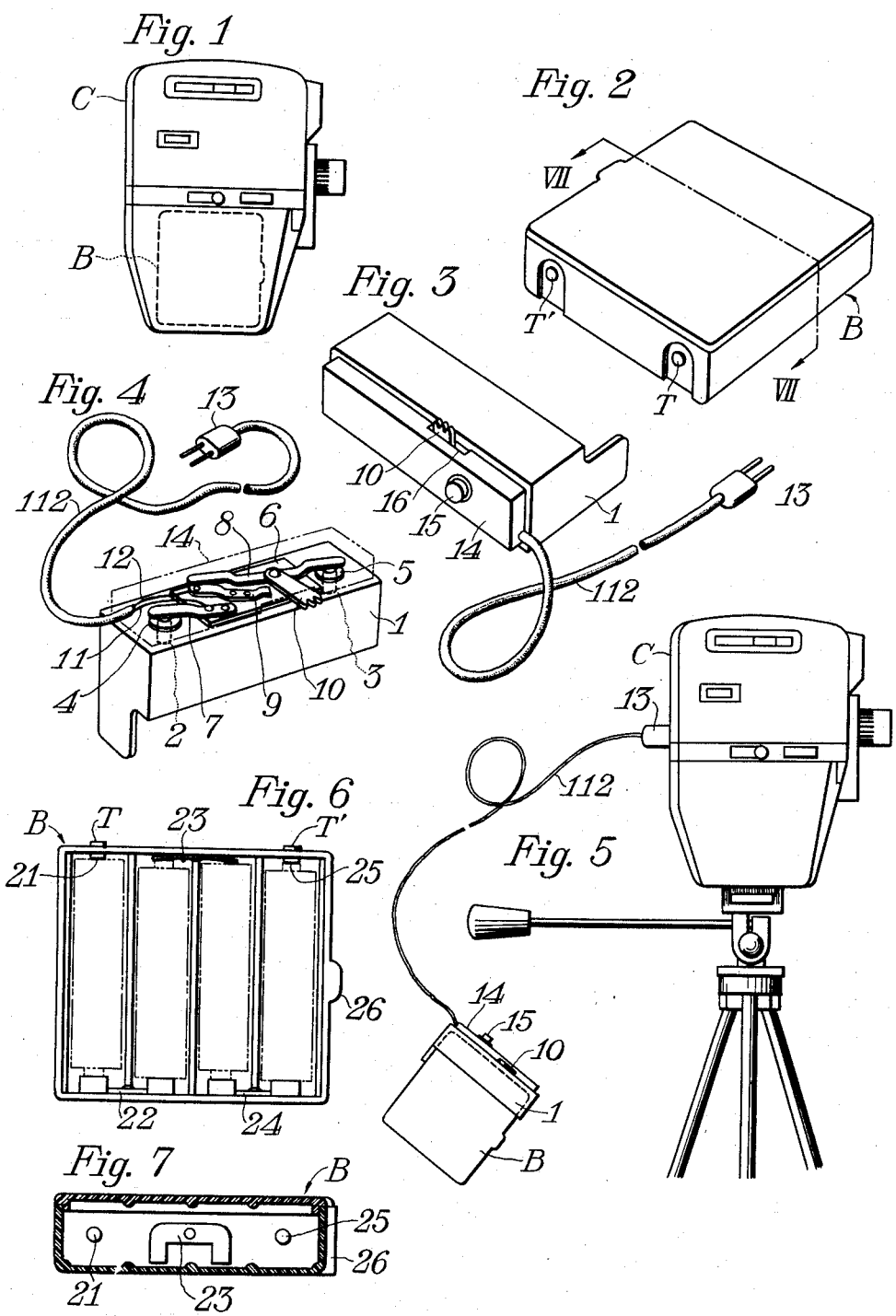

United States Patent Office 2,927,226
Patented Mar. 1, 1960

2,927,226

REMOTE CONTROL DEVICE FOR AN ELECTRICALLY DRIVEN MINIATURE CINEMATOGRAPHIC CAMERA

Yoshinobu Sakaki, Chikusa-ku, Nagoya, Japan

Application October 29, 1958, Serial No. 770,535

Claims priority, application Japan October 31, 1957

2 Claims. (Cl. 307—156)

This invention relates to a remote control device for an electrically driven cinematographic camera.

It has been proposed to design the electrically driven miniature cinematographic camera so as to be remote controlled, with the camera held mounted upon a tripod, the body of a vehicle, or other suitable support located at a place distant from the operator. Two types of system for such remote control may be designed, one consisting in providing a source of current for driving the motor in the camera body and connecting a cord of desired length having at its free end a controlling switch, and the other type system consisting in connecting a cord of desired length to the camera body and providing both source of current and the controlling switch at the free end of said cord. The present invention concerns with the latter type of remote control system, and has for its object to provide an improved remote control device which is simple in construction, economical to manufacture, can readily be assembled, and is reliable in operation.

Another object is to provide such remote control device having a container of source of current, i.e. dry cell or battery case, which may be combined with the switch mechanism for remote control, and on the other hand which may be used mounted in the camera body for ordinary direct drive, so that the similar container of source of current may be employed for remote control as well as for the direct control.

The accompanying drawing will serve to illustrate specific embodiment of my invention, in order that its utility and functioning will be thoroughly appreciated. It will be understood, however, that this is by way of illustration only and is not to be taken as limiting the invention in any way. In the drawing:

Figure 1 is a side view of an electrically driven miniature cinematographic camera containing a source of current and an electric motor for driving the conventional camera shutter and the film feeding mechanism therein, Figure 2 is a perspective view of the case containing a series of dry cells, Figure 3 is a perspective view of the cap to be mounted and connected to said dry cell case constructed according to this invention, Figure 4 is a top perspective view of said cap with its cover removed, Figure 5 is a side view of the camera and the dry cell case connected through a cord so that the driving motor in the camera may be remote controlled.

Figure 6 is a plan view of the dry cell case with the cover plate removed, and

Figure 7 is a sectional view taken along line VII—VII of Figure 1.

Referring to the drawing, C designates generally a miniature cinematographic camera of 8 mm. type, containing an electric motor (not shown) for driving the conventional camera shutter and the film feeding mechanism, which motor being supplied with current from a source such as a series of dry cells or battery contained in a case B made of insulating material and enclosed in the camera body. Said dry cell case is provided with terminals T and T'. As will be seen from Figures 3 and 4, a cap 1 is provided with inwardly projecting contacts 2 and 3 which are carried by insulating discs 4 and 5 respectively, and adapted to be brought into contact with said terminals T and T', respectively, when the cap 1 is put on the case B. Supported by the insulating plate 6 on the cap body 1, there are mounted conductor pieces 7 and 8, one end of each of them being in contact with said contacts 2 and 3 respectively. The other end of the resilient conductor piece 8 is bent offset upwardly and is kept apart from the insulating plate 6. Beneath said offset portion of the conductor piece 8, there is one end of an intermediate conductor piece 9 mounted on the insulating plate 6, leaving a gap therebetween. Pivotally connected to the mid point of the conductor piece 8, there is a switch lever 10 having its free end protruded outwardly through an opening 16 formed in the top cover 14 as shown in Figure 3. The conductor piece 7 and the intermediate conductor piece 9 are connected through the lead wires 11 and 12, respectively, to a plug 13 to be inserted to a socket in the camera body C. The cap body 1 has the top cover 14 which covers said insulating plate 6 and the conductor pieces mounted thereon. Mounted to said top cover 14, there is a push button 15 adapted to push the offset portion of the resilient conductor piece 8 into contact with the intermediate conductor piece 9.

The dry cell case B is made preferably of a thermoplastic material, and is provided with contact pieces 21, 22, 23, 24 and 25, the contacts 21 and 25 being connected to the terminals T and T' respectively, as shown in Figures 6 and 7. On one side wall of the case B, there is formed a ridge 26. In the camera body there is provided an obstacle member (not shown) to prevent insertion of said ridge 26, so that the dry cell case B is always put into the camera body in the predetermined correct position with said ridge 26 positioned at the position opposite to the said obstacle member in the camera body.

Operation of the invention is as follows: In ordinary manner of use, the container of source of current, i.e. the dry cell case B mounted in the camera body C, as shown in Figure 1, is employed and the motor driven thereby is controlled by manipulating the switch lever or button (not shown) provided in the camera body. When it is desired to effect the remote control, said source of current B in the camera body is kept inoperative by opening the circuit by locking said switch in the camera body in the open position. Or, alternatively, said dry cell case B may be removed from the camera body. On the otherhand, the cap 1 containing the switch mechanism and the cord 112 is mounted upon the similar spare dry cell case B prepared separately or the case B taken out from the camera body, and the plug 13 is inserted into the socket in the camera body C. By pushing the push button 15, the contact will be made of the resilient conductor piece 8 and the intermediate conductor piece 9, whereby completing the circuit of the driving motor in the camera body through the terminal T, the contact 2, the conductor piece 7, the lead wire 11, the plug 13, the motor in the camera body, the lead wire 12, the intermediate conductor piece 9, the conductor piece 8, the contact 3, the terminal T', and the dry cells in the case B, so that the conventional camera shutter and the film feeding mechanism will be operated until said push button 15 is released. Alternatively, when the switch lever 10 is moved to the left from the position shown in Figure 4, it will contact with the intermediate conductor piece 9, so that the similar circuit may be completed and the camera shutter and the film feeding mechanism may be operated continuously without the necessity of continuing depression of the push button 15. By returning the switch lever 10, the circuit will be opened to stop the driving.

From the foregoing it will be seen that according to this invention the desired remote control of the camera shutter and the film feeding mechanism may readily be effected by means of the push button, or by means of the locking switch lever, at a point remote from the camera.

What I claim is:

1. A remote control device for an electrically driven miniature cinematographic camera, comprising a container of source of current having terminals, a cap to be mounted upon said container and having two contact pieces to be brought in contact with said terminals on said container, an intermediate conductor piece mounted upon said cap and connected with one lead wire of the cord to be connected to the camera body, a resilient conductor piece connected with one of said contact pieces and normally held apart from said intermediate conductor piece, second conductor piece connected to other of said contact pieces and connected with other lead wire, a push button on the cap for depressing said resilient conductor piece into contact with said intermediate conductor piece, and a locking switch lever pivoted to said resilient conductor piece and adapted to be moved into contact with said intermediate conductor piece, the cord including said two lead wires having a plug adapted to be inserted into a socket in the camera body.

2. A remote control device for an electrically driven miniature cinematographic camera as recited in claim 1, wherein said container of source of current is provided with a ridge on the outer side of one of the side walls thereof.

References Cited in the file of this patent

UNITED STATES PATENTS 1,286,800    Schulte _____ Dec. 3, 1918